United States Patent [19]
Trowbridge et al.

[11] 3,773,353
[45] Nov. 20, 1973

[54] INFLATING DEVICE FOR USE WITH VEHICLE SAFETY SYSTEMS

[75] Inventors: Donald R. Trowbridge, Carbondale; Kenneth R. Jenkins, Anna, both of Ill.

[73] Assignee: Olin Corporation, New Haven, Conn.

[22] Filed: Sept. 5, 1972

[21] Appl. No.: 286,480

[52] U.S. Cl............. 280/150 AB, 102/40, 60/26.1
[51] Int. Cl............................................ B06r 21/08
[58] Field of Search........................... 280/150 AB; 102/37.7, 39, 40; 23/281

[56] References Cited
UNITED STATES PATENTS

| | | | |
|---|---|---|---|
| 3,713,667 | 1/1973 | Blanchard | 280/150 AB |
| 3,649,045 | 3/1972 | Smith | 280/150 AB |
| 3,674,059 | 7/1972 | Stephenson | 280/150 AB |
| 3,089,418 | 5/1963 | Stiefel | 102/39 |
| 2,779,281 | 1/1957 | Maurice et al. | 102/39 |

Primary Examiner—Kenneth H. Betts
Assistant Examiner—John P. Silverstrim
Attorney—Donald R. Motsko et al.

[57] ABSTRACT

An apparatus is provided for use in safety systems utilizing a propellant charge and an inflatable member such as a safety bag for a vehicle. A propellant storage housing is provided in which two separate propellant charges are provided in axial alignment with one propellant charge adapted to be ignited during slow deployment of the system and both charges adapted to be ignited during fast deployment of the system. Two separate ignitors at the same end of the propellant housing, each of which is associated with a different propellant charge. Means are provided to provide a path through the first propellant charge to permit the ingitor to ignite the second propellant charge without igniting the first charge.

8 Claims, 4 Drawing Figures

INFLATING DEVICE FOR USE WITH VEHICLE SAFETY SYSTEMS

BACKGROUND OF THE INVENTION

The present invention relates generally to the field of vehicle safety systems of the type utilizing an inflatable confinement. More particularly, this invention relates to an improved inflating system for inflating the confinement of such devices.

A great deal of effort is being given to the problem of increasing the safety of passenger vehicles. As well as trying to increase the safety of the vehicle itself, considerable effort is being given to the development of passive restraint systems which will protect the occupant of the vehicle from injury due to impact without the necessity of the occupant taking any positive action.

One type of passive restraint system which has been developed utilizes an inflatable confinement such as a bag which is automatically inflated in response to a predetermined condition such as an impact to or the upsetting of the vehicle to protect the occupant from contacting the interior of the vehicle and injuring himself.

The present invention is concerned with a vehicle safety system of the type which utilizes an inflatable confinement means, a stored fluid under pressure, and a propellant charge for the generation of hot gas. When a collision of the vehicle is sensed, the propellant charge is ignited and the hot gas resulting therefrom is caused to mix with the stored fluid and the mixture released to inflate the confinement. With systems of this type, under some circumstances if the safety bag is deployed too rapidly, there is a possibility of a high sound level which could be irritating and harmful to the occupant, a possibility of abrasion to the occupant due to bag contact, and the possibility of inducing trauma to the occupant.

SUMMARY OF THE INVENTION

The present invention has as one of its objects the provision of an improved inflating device for inflating a confinement which is capable of two levels of inflation, fast for a high speed crash and slow for a low level crash.

Another object of the present invention is the provision of an improved inflating device for inflating the confinement of vehicle safety systems wherein the noise level and passenger discomfort is reduced under certain circumstances.

In accordance with the preferred embodiment of the invention, an apparatus is provided for use in safety systems utilizing a propellant charge and an inflatable member. A propellant storage housing is provided in which two separate propellant charges are provided in axial alignment. Two separate ignitors are provided at one end of the propellent housing, each of which is associated with a different propellant charge. Means are provided to provide a path thorugh the first propellant charge to permit the ignitor to ignite the second propellant charge without igniting the first.

DETAILED DESCRIPTION

Figure 1:
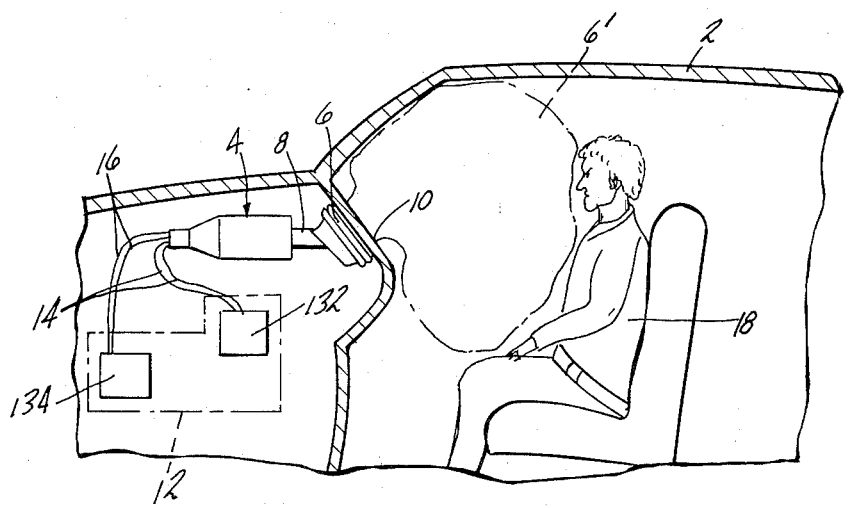
FIG. 1 is a partially broken away, fragmentary, side view of a vehicle equipped with a safety device incorporating the present invention and showing one arrangement of such a system in the vehicle.

Referring to the drawings, and in particular FIG. 1, a system incorporating the present invention is shown mounted in a vehicle 2. The system includes an inflating unit 4 connected to an inflatable confinement 6 by means of a manifold 8. The confinement 6 in the example shown, is mounted in the dashboard 10 of the vehicle 2 in its deflated or collapsed storage position. The confinement 6 may be in the form of a flexible bag of rubber, cloth, or the like and may be vented in any known manner or may be non-vented if desired.

Collision sensing means 12 are attached to the vehicle 2 and are connected to the inflator 4 by suitable electrical connectors 14 and 16. The sensing means 12 are of the type which will produce an electric current when the vehicle is involved in a collision of a predetermined magnitude. As explained in more detail below, electrical leads 14 will carry a current from the sensing means 12 in response to a low level crash and when slow deployment of the system is desired, while both leads 14 and 16 carry an electric current when the vehicle is involved in a high speed crash and when fast deployment of the system is required. The electric current from the sensing means 12 serves to actuate the inflator 4 which in turn inflates the confinement 6 into its expanded condition as indicated at 6' to provide a soft cushion against which the occupant 18 of the vehicle 2 will impact.

Figure 2:
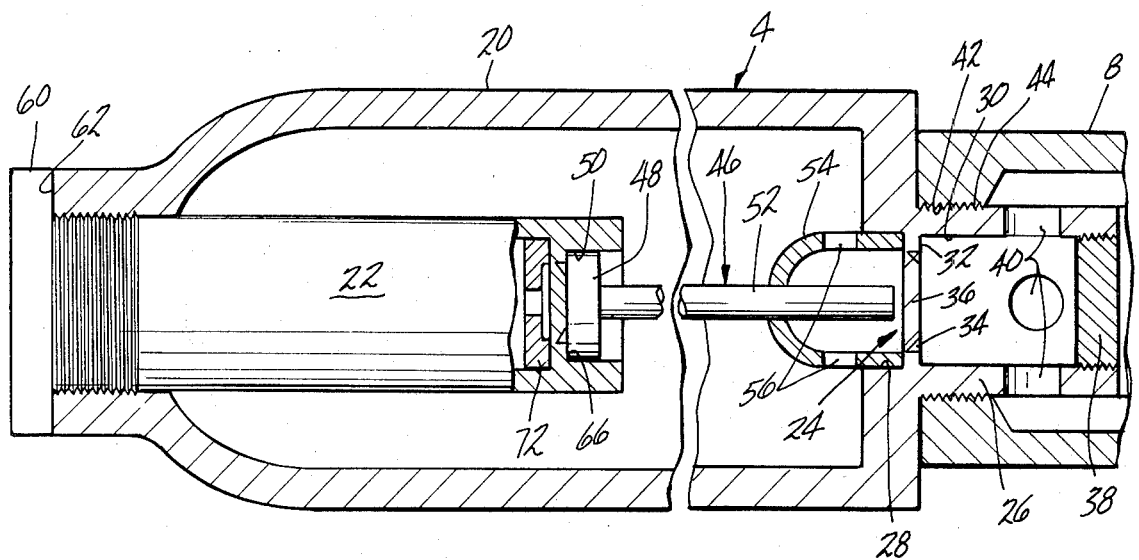
FIG. 2 is a partial cross-sectional view of an inflating unit incorporating the present invention.
Figure 3:
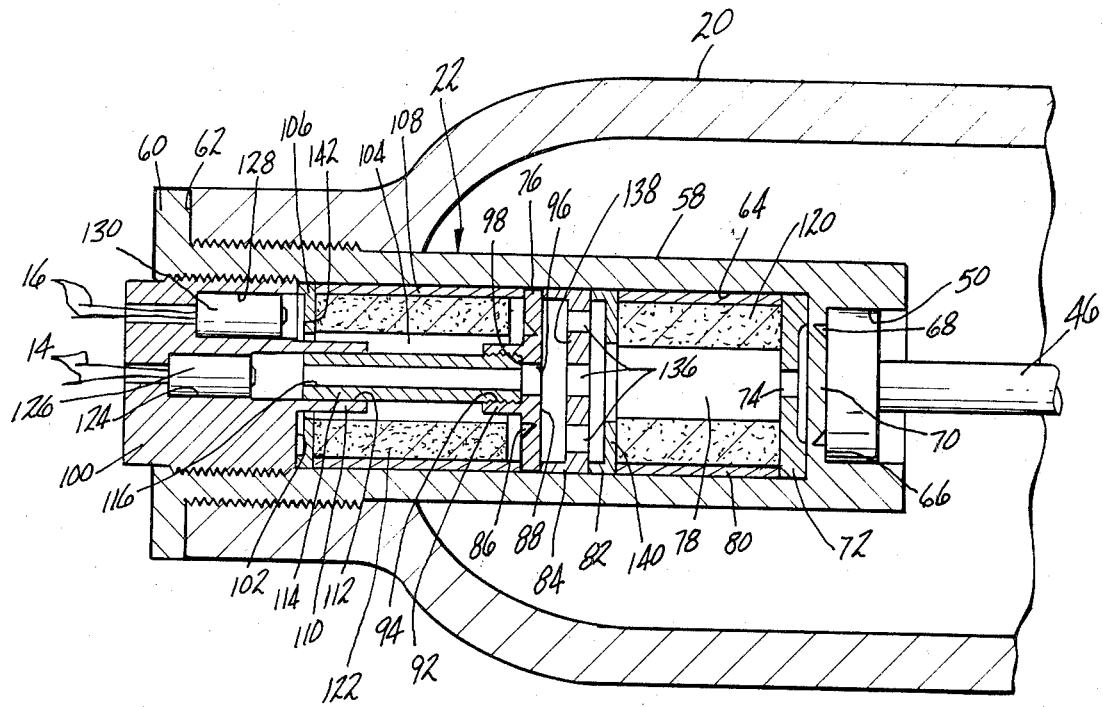
FIG. 3 is an enlarged cross-sectional view showing the details of the propellant chamber of the inflating unit shown in FIG. 2.

The inflating unit 4 which is shown in greater detail in FIG. 2, comprises a fluid storage reservoir 20 in the shape of an elongated bottle fabricated from a high strength material such as steel, aluminum, or the like. The forward, or left hand end as viewed in FIG. 2 is reduced to the bottle like shape and is closed by a propellant storage means 22. The rearward end is closed by an integral portion of the reservoir 20 and includes an outlet portion 24. The outlet portion 24 of the reservoir 20 includes a rearward extension portion 26 formed integrally with the remainder of the reservoir 20. A recess or bore 28 extends rearwardly in the outlet portion 24 with its open end communicating with the interior of the reservoir 20. The bore 28 is separated from a bore 30 in the rearward end of the extension portion 26 by a web 32. The web 32 is provided with a circular groove 34 which forms a rupturable closure portion 36 closing the interior of the reservoir 20 from the manifold 8 and the inflatable confinement 6.

The bore 30 in the outlet portion 24 of the reservoir 20 has its open end closed by a plug 38 threadedly secured thereto. The walls defining the bore 30 have a plurality of apertures 40 therein, each aperture having an axis substantially perpendicular to the axis of the bore 30. The apertures 40 serve to diffuse the exiting gases and are so dimensioned so as to prevent the rupturable closure portion 36 from passing through the manifold 8 into the confinement 6 after it has broken loose from the web 32.

The manifold 8 is connected to the outlet 24 by means of an internally threaded portion 42 being connected to the threaded portion 44 of the rearward extension 26.

A rod member 46 extends from the inner end of the propellant storage means 22 to the bore 28 and terminates at a point slightly spaced from the rupturable closure portion 36. The rod member 46 includes an enlarged head portion 48 mounted in a bore 50 in the end of the propellant storage means 22. The elongated reduced portion 52 of the rod member 46 is supported adjacent its end by a deflecting member 54 which has a plurality of apertures 56 therein, the axis of which are perpendicular to the axis of the outlet portion 24.

The interior of the reservoir 20 is adapted to contain a non-toxic fluid under pressure. Such fluid may be argon, helium, nitrogen, oxygen, or other suitable fluids or mixtures thereof.

The propellant storage means 22 includes a generally cylindrical housing member 58 which is threadedly secured to the reduced end of the reservoir 20. A flange 60 on the housing member 58 abuts against the end face 62 of the reduced portion of the reservoir 20. The housing member 58 includes a bore 64 extending inwardly from its outer end to a web 66 between it and the bore 50 in the other end of the housing member 58. The web 66 includes a circular groove 68 which defines a rupturable closure portion 70 designed to break loose from the remainder of the burst diaphragm at a predetermined pressure. A nozzle member 72 having a suitable orifice 74 therein, is positioned in the bore 64 against the web 66.

A propellant chamber separating member 74 is positioned within the bore 64 and is spaced from the nozzle member 72 a sufficient distance to provide a primary propellant chamber 78. A sleeve member 80, a shield member 82 and a diaphragm catcher 84 are positioned within the primary propellant chamber 78 and hold the propellant chamber separating member 76 the required distance from the nozzle member 72. The propellant chamber separating member includes a circular groove 86 which defines a rupturable closure portion 88 which will break loose from the remainder of the member 76 when a predetermined pressure in the secondary propellant chamber 90 is obtained.

The propellant chamber separating member 76 is provided with a rearwardly extending flange portion 92 having a threaded bore 94 therein and which joins the main body of the separating member 76 within the confines of the circular groove 86. A reduced bore 96 extends through the main body of the separator member 76 and forms a shoulder 98.

The housing member 58 is closed at its outer end by an end cap 100. The inner face 102 of the end cap 100 is spaced from the propellant separating member 76 a sufficient distance to provide a secondary propellant chamber 104. The propellant separating member 76 is held against the diaphragm catcher 84 by the end cap 100 bearing against a shield 106 which in turn bears against a sleeve 108 which abuts the member 76.

The end cap 100 is provided with an inwardly extending extension portion 110 having a bore 112 therein. An ignitor tube 114 having an axial bore 116 extending therethrough is mounted between the end cap 100 and the propellant chamber separating member 76. One end of the ignitor tube 114 is threadedly secured within the threaded bore 94 in the flange portion 92 of the separating member 76. The other end of the ignitor tube 114 extends into the bore 112 in the extension portion 110 of the end cap 100.

Each of the propellant chambers 78 and 104 are provided with propellant charges 120 and 122 respectively as shown. The respective propellant charges 120 and 122 may be of any suitable type capable of generating a hot non-toxic gas when ignited and mixed with the stored fluid in the reservoir 20. The propellant charges 120 and 122 may be in the form of loose powder granules, a single gas generating grain, or a plurality of large grains.

A suitable bore 124 is provided in the main body of the end cap 100 in alignment and communication with the bore 116 in the ignitor tube 114. A suitable ignitor 126, such as a squib member, is contained within the bore 124 and is connected to the sensing means 12 by the electrical leads 14. A bore 128 is also provided in the end plug 100 in which is mounted a second ignitor member 130 which also may be a squib member. The ingitor member 130 is in communication with the propellant charge 122 in the secondary propellant chamber 104 so that when an electric current is passed through its leads 16 the ignitor member 103 will be fired to ignite the propellant charge 104.

As stated before, inflator 4 is to be used in a system which has both a high level deployment and a low level deployment. By way of example, in the case of a vehicle such as an automobile, low level or slow deployment may be used in connection with those crashes occurring when the vehicle speed is between 15 and 20 miles per hour. The high level or fast deployment may be used at vehicle speeds over 20 miles sensor hour. to The sensing means 12 used to fire the ignitors 126 and 130 may consist of two separate sensors 132 and 134. Sensor 132 may be designed to sense a collision at a low level or slow speeds and send an electric current to ignitor member 126, while snesor 134 should be designed to be actuated only in the case of a high speed crash whereupon it will send an electric current ot ignitor member 130. Obviously, in the case of a high speed crash, sensor 132 will also be actuated. Such sensing devices may be an accelerometer, inertia responsive switch, or other devices well known in the art. It is also contemplated that other sensing means may be used such as a single sensor which would only actuate the low level circuit including leads 14 during a low speed crash, but would actuate two electric circuits including leads 14 and 16 during a high speed crash.

During a low level deployment of the system, when a low speed crash is sensed, ignitor member 126 will be fired by means of an electric current passing through leads 14. The ignitor member 126 fires down the bore 116 of the ignitor tube 114 and through the bore 96 in the propellant chamber separating member 76 to ignite the propellent charge 120 in the primary propellant chamber 78 without igniting the propellant charge 122 in the secondary propellant chamber 104.

The ignition of the propellant charge 120 and the pressurization of the propellant chamber 78 causes the rupture of the rupturable closure portion 70 in the web 66 and causes the rod member 46 to move to the right as viewed in FIG. 2 where it impacts upon rupturable closure portion 36 to cause the rupture thereof. The hot propellant gas generated by the burning of the propellant charge 120 flows out of the propellant chamber 78 into the interior of the reservoir 20 and mixes with the stored fluid contained therein. The mixture of the hot gas and stored fluid then flows out of the outlet 24 through the apertures 40 in the extension portion 26 of the reservoir 20, through manifold 8 to the confinement 6 and causes the inflation thereof.

Figure 4:
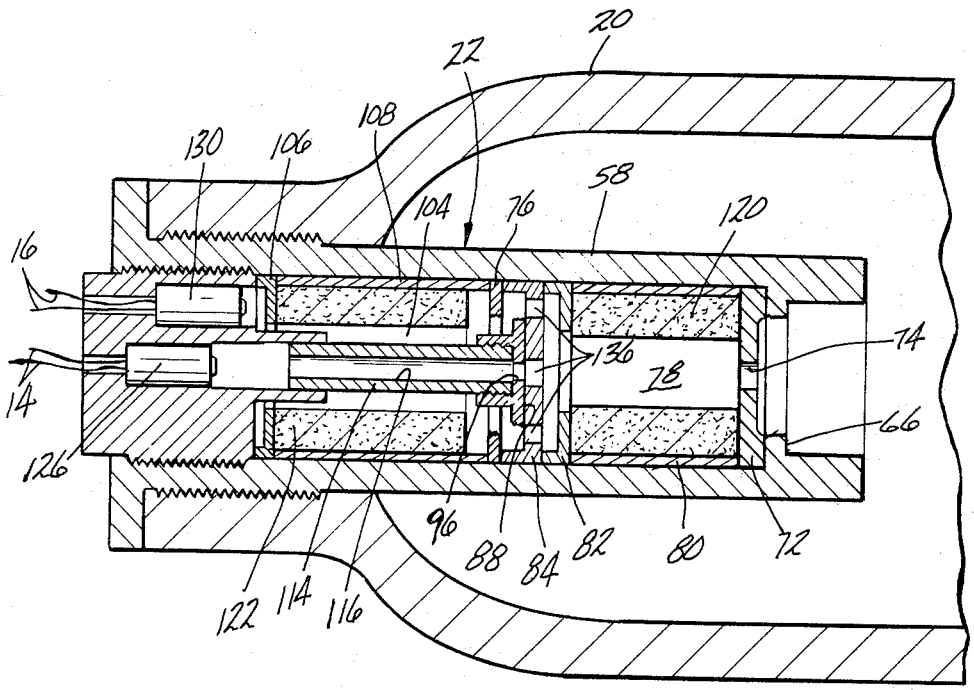
FIG. 4 is an enlarged cross-sectional view similar to that of FIG. 3 but showing the components of the propellant chamber in a position during the high level deployment of the system.

In the event of a high speed crash, when fast deployment of the system is required, both ignitor members 126 and 130 will be fired by the suitable sensing means. The ignitor member 126 will function in the manner previously described to ignite the propellant charge 120 in the primary propellant chamber 78. Ignitor 130 will serve to ignite the propellant charge 122 in the secondary propellant chamber 104. As pressure is built up in the secondary propellant chamber 104, the rupturable closure portion 88 of the propellant chamber separating member 76 will break loose from the remainder of the member 76 at the predetermined pressure. The rupturable closure portion 88 as well as the ignitor tube 114 will move forward as shown in FIG. 4 and be caught by the diaphragm catcher 84 which has a plurality of apertures 136 therein. It is noted that the transverse body portion 138 of the diaphragm catcher 84 is spaced from the propellant separating member 76 in its normal position so that when the rupturable closure portion 88 thereof breaks loose, it will move forward to provide an opening for the gases from the burning of the secondary propellant charge 122 to pass through. The gases will pass through at least some of the apertures 136 in the diaphragm catcher 84 into the primary propellant chamber 78 and out through the opening resulting from the rupture of the rupturable closure portion 70 into the reservoir 20.

The shield members 82 and 106 both include a circular flange 140 and 142 respectively which at least partially covers the ends of the propellant charges 120 and 122 closer to the ignitor members 126 and 130. This prevents damage to the end of each propellant charge during the firing of the respective ignitors which could result in a charge in ballistic characteristics.

By virtue of the above described arrangement, a dual deployment inflator is provided wherein two separate propellant charges are used. With the above described arrangement, the propellant charges can be in axial alignment with each other. The ignitor tube 114 permits the ignitor 126 to ignite the primary propellant 120 without causing the ignition of the secondary propellant charge 122 during slow deployment of the system while permitting the ignitor members for both propellant charges to be positioned at the same end of the unit.

What is claimed is:

1. An apparatus for use in connection with a safety system utilizing an inflatable member, said apparatus comprising:
   a. propellant storage means having an outlet end and a remote end spaced therefrom;
   b. two propellant chambers in said propellant storage means in axial alignment with each other with one positioned adjacent said outlet end and the other positioned adjacent said remote end;
   c. a propellant charge in each of said chambers;
   d. a first ignitor means positioned at said remote end for igniting the propellant charge in the propellant chamber adjacent said outlet end;
   e. second ignitor means for igniting the propellant charge in the propellant chamber adjacent said remote end; and
   f. means providing a fire path from said first ignitor means through said propellant chamber adjacent said remote end to said propellant chamber adjacent said outlet end to permit the ignition of said propellant charge in said propellant chamber adjacent said outlet end upon firing of said first ignitor means without igniting the propellant charge in said propellant chamber adjacent said remote end.

2. The apparatus of claim 1 wherein means are provided preventing communication between the two propellant chambers if only the propellant charge in the propellant chamber positioned adjacent said outlet end is ignited and providing communication between the two propellant chambers if the propellant charge in the propellant chamber positioned adjacent said remote end is ignited.

3. The apparatus of claim 1 wherein said propellant chambers are separated from each other by a separator member having an orifice therethrough, said means for providing a fire path including an ignitor tube extending from a point adjacent said first ignitor means through said propellant chamber positioned adjacent said remote end to said separator member in communication with the orifice therein.

4. The apparatus of claim 3 wherein said separator member includes an extension portion extending toward said first ignitor with the orifice extending therethrough, a shoulder in said orifice, said ignitor tube being threadedly received in said orifice.

5. An apparatus for use in connection with safety systems of the type including an inflatable member, a stored fluid under pressure, and a propellant for the generation of hot gas, said apparatus including:
   a. storage means for storing a fluid under pressure and including a closed outlet;
   b. propellant storage means having an outlet end and a remote end spaced therefrom;
   c. two propellant chambers in said propellant storage means in axial alignment with each other with one positioned adjacent said outlet end and the other positioned adjacent said remote end;
   d. a propellant charge in each of said propellant chambers;
   e. first ignitor means positioned at the remote end for igniting the propellant charge in the propellant chamber adjacent said outlet end;
   f. second ignitor means positioned at said remote end for igniting the propellant charge in the propellant chamber adjacent said remote end;
   g. means providing a fire path from said first ignitor means through said propellant chamber adjacent said remote end to said propellant chamber adjacent said outlet end to permit the ignition of the propellant charge in the propellant chamber adjacent said outlet end upon firing of said first ignitor means without igniting the propellant charge in said propellant chamber adjacent said remote end;
   h. means for firing only said first ignitor in response to the sensing of a condition wherein slow deployment of the system can be used, and for causing the ignition of both said ignitors in response to the sensing of a condition wherein fast deployment of the system is required;
   i. means providing communication between each of said propellant chambers and said storage means if its propellant charge is ignited; and j. means operable when the system is actuated to open the outlet and permit the propellant gas and stored fluid to escape from said storage means.

6. The apparatus of claim 5 wherein means are provided preventing communication between the two propellant chambers if only the propellant charge in the propellant chamber positioned adjacent said outlet end is ignited and providing communication between the two propellant chambers if the propellant charge in the propellant chamber positioned adjacent said remote end is ignited.

7. The apparatus of claim 5 wherein said propellant chambers are separated from each other by a separator member having an orifice therethrough, said means for providing a fire path including an ignitor tube extending from a point adjacent said first ignitor means through said propellant chamber positioned adjacent said remote end to said separator member in communication with the orifice therein.

8. The apparatus of claim 7 wherein said separator member includes an extension portion extending toward said first ignitor with the orifice extending therethrough, a shoulder in said orifice, said ignitor tube being threadedly received in said orifice.

* * * * *